United States Patent [19]

Clark et al.

[11] Patent Number: 4,493,451

[45] Date of Patent: Jan. 15, 1985

[54] FILLING FISSURES IN METAL ARTICLES

[75] Inventors: Stephen D. Clark, Colne; Philip S. Wood, Barnoldswick; Peter J. Fell, Steeton, Nr Keighley; all of England

[73] Assignee: Rolls-Royce Limited, London, England

[21] Appl. No.: 432,825

[22] Filed: Oct. 5, 1982

[30] Foreign Application Priority Data

Oct. 17, 1981 [GB] United Kingdom ............... 8131372

[51] Int. Cl.$^3$ .............................................. B23P 6/04
[52] U.S. Cl. .................................... 228/119; 228/238; 29/402.18
[58] Field of Search ............... 228/119, 194, 238, 239, 228/226, 200; 29/402.04, 402.07, 402.09, 402.18, 402.21, 156.8 B

[56] References Cited

U.S. PATENT DOCUMENTS

| 3,425,116 | 2/1969 | Crooks | 228/200 X |
| 3,737,978 | 6/1973 | Rathbun | 228/200 X |
| 3,882,596 | 5/1975 | Kendziora et al. | 228/200 |
| 4,008,844 | 2/1977 | Duvall et al. | 228/119 |
| 4,050,133 | 9/1977 | Cretella et al. | 228/402.18 |
| 4,110,887 | 9/1978 | Kachik | 29/402.18 |
| 4,285,459 | 8/1981 | Baladjanian et al. | 29/402.07 |
| 4,381,944 | 5/1983 | Smith, Jr. et al. | 29/402.18 |

*Primary Examiner*—Kenneth J. Ramsey
*Assistant Examiner*—M. Jordan
*Attorney, Agent, or Firm*—Cushman, Darby & Cushman

[57] ABSTRACT

Superalloy components which have defects such as pits, machining errors or any other 'lack of metal' condition can be repaired using a braze stabilized sinter process. The invention includes filling the defect with a mixture of base super-alloy powder mixed with a low temperature braze alloy. A higher temperature alloy is overlayed and the component subjected to a vacuum furnace cycle that includes a dwell between the melting points of the two braze alloys. This dwell allows the lower temperature alloy to melt and isothermally solidify by the process of diffusion. This effectively 'stabilizes' the sinter which is porous. On further heating, the higher temperature braze alloy melts and flows into the interstices of the sinter, forming a pore-free solid mass. The higher temperature braze alloy can also be diffused by holding at elevated temperatures. This increases the remelt temperature of the repair should further thermal cycling be required.

6 Claims, No Drawings

FILLING FISSURES IN METAL ARTICLES

This invention relates to inter alia the repair of metal articles which, during their manufacture or use, have developed or otherwise had formed therein, fissures, pits and/or other undesirable blemishes.

The invention has particular efficacy in the repair of turbine and other components which are required to perform in a hot environment.

It is known, to place a nickel base superalloy in powder form, in a fissure which has been formed in a manufactured member of a similar material, and to sinter the powder in situ and then in a separate furnace cycle, place a braze alloy of lower melting point than the sintering temperatures of the nickel base powder, over the sintered powder and heat the assembly until the braze powder melts and capillaries into the interstices of the powder, thus making a substantially solid mass. Having achieved this infill, the temperature to which the member may be re-heated, either for the purpose of further, unrelated treatments, or in use, is dictated by the melting temperature of the lower temperature braze alloy.

The present invention seeks to provide an improved method filling cracks, fissures, pits and the like, or making up lost metal in a manufactured articles.

Accordingly the present invention comprises a method of filling a fissure in a superalloy article including the steps of diffusion brazing a powdered mixture of the superalloy and a first brazing alloy of given melting point together and to the interior of the fissure and filling the resulting interstices with a further brazing alloy of higher melting point than said first brazing alloy.

Preferably the method includes the step of half filling the fissure with said powdered mix of superalloy and first brazing alloy and completing the fill with said further brazing alloy.

The method of filling a fissure includes the step of mixing the powdered super alloy and first brazing alloy in the ratio 85:15.

The method may include the step of performing the diffusion brazing of the powdered mix of superalloy and first brazing alloy and article and the melting of the further brazing alloy, in a continuous heating cycle.

Preferably the method includes the step of achieving the respective diffusion brazing and brazing alloy melting in a vacuum furnace.

The method may include the steps of partially cooling the article in said vacuum, further cooling the article by blowing with an inert gas and finishing the cooling in ambient atmospheres.

The invention will now be described by way of example.

A gas turbine engine turbine blade is manufactured from a Nickel based alloy, sold under the trade name MARM002. The alloy is formed from the following constituents, stated quantities of each of which are nominal:

| | |
|---|---|
| Co | 10% |
| Cr | 9% |
| W | 10% |
| Ti | 1.5% |
| Al | 5.5% |
| Ta | 2.5% |
| Hf | 1.5% |
| C | 0.15% |
| B | Minimal |
| Ni | Balance |

Fissures in the blade, which may have been caused by e.g. frettage during use, or by stray attack during an electric discharge machining operation on the blade, are required to be filled.

A quantity of the alloy from which the blade is manufactured, is obtained in powder form, and mixed with a brazing metal which is also in powder form, in the proportion 85% to 15%.

The powder particle size of the blade metal is ($-90+45$ μm)

The brazing metal powder is sold under the registered trade name NICROBRAZ L.M. and its constituents are as follows:

| | |
|---|---|
| Cr | 7.0% |
| B | 2.9% |
| Si | 4.5% |
| Fe | 3.0% |
| C | 0.1% max |
| Ni | Balance |

The fissure is half filled with the mixture, tapped level and then filled to the top with a further brazing metal powder, sold under the registered trade name NICROBRAZ 30. The constituents of this brazing metal are:

| | |
|---|---|
| Si | 10.2% |
| Cr | 19% |
| Ni | Balance |

The blade is then put in a vacuum furnace and subjected to the following heating cycle:
Half hour at 950° C.
One hour at 1050° C.
One hour at 1190° C.

Maintaining the furnace temperature at 950° C. for the first half hour, enables the conditions therewithin, to stabilize.

Raising the temperature to 1050° C. and maintaining it for one hour, causes the "NICROBRAZ LM" (Registered Trade Mark) to melt. The braze metal flows around the surfaces of the powder particles of the Nickel alloy, reacting with the said powder causing it to bond together by a sintering process.

Diffusion of the braze alloy also takes place at this temperature causing isothermal solidification. There then exists in the fissures, a diffusion brazed conglomorate having about 35% porosity, covered by a further braze metal powder i.e. the NICROBRAZ 30 (Registered Trade Mark).

Raising the temperature still further to 1190° C., and holding for one hour, melts the "NICROBRAZ 30" (Registered Trade mark) which flows inwards, to fill the interstices and on cooling creates a substantially solid mass i.e., porosity is obviated.

Cooling is achieved by removing the heat source and allowing the blade to cool in the vacuum furnace in which the vacuum is maintained, to a temperature of 1000° C. The blade is then cooled in the furnace with Argon gas, until its temperature has dropped to below 100° C. after which it which it can be removed to atmosphere.

Brazing metal which stands proud of the surface, can be machined off by any suitable means. Before filling the fissure with material as described hereinbefore, it will be essential to clean the blade. If the fissure has been created by frettage, it will be sufficient to clean the blade in a caustic/gluconate solution. If the fissure results from electro discharge machining operations, it will be necessary to grit blast the portion containing the fissure, followed by etching in a ferric chloride liquor and then degreasing and cleaning it in a caustic/gluconate solution.

The main advantage derived from the present invention, is that by diffusion brazing the powdered super alloy rather than than merely sintering, enables the use of a braze metal filler which has a much higher melting point than has been possible hitherto. It follows, that any further heat treatments which the blade may need to undergo, can be effected without remelting the interstices filler or destroying the keying effect of the diffusion braze.

In some applications, it may be necessary to completely fill in the fissure with the mix and top the mixture with the high melting point filler, which in such a case, will stand proud of the surface of the article, before being melted.

We claim:

1. A method of filling a fissure in an article made from a superalloy including the steps of:
    placing a powdered mixture of a superalloy, which is the same as the superalloy of the article, and a first brazing alloy of a given melting point in the fissure;
    superimposing a further powdered brazing alloy thereon, said further brazing alloy having a higher melting point than the given melting point of the first brazing alloy of the powdered mixture;
    heating the whole to a predetermined temperature and for a time period sufficient for melting the first brazing alloy of the powdered mixture so as to effect diffusion brazing of the powdered mixture of the superalloy and firt brazing alloy to provide a sinter with interstices; and
    then further raising the temperature to effect melting of the further brazing alloy and filling therewith the interstices of the sinter which resulted from said diffusion brazing.

2. A method of filling a fissure as claimed in claim 1 including the step of half filling the fissure with said powdered mixture of superalloy and first brazing alloy and completing the fill with said further brazing alloy.

3. A method of filling a fissure as claimed in claim 1 or claim 2 including the step of mixing the powdered super alloy and first brazing alloy in the ratio 85:15.

4. A method of filling a fissure as claimed in claim 3 including the step of performing diffusion brazing of the powdered mixture of the superalloy and the first brazing alloy and article and the melting of the further brazing alloy, in a continuous heating cycle.

5. A method of filling a fissure as claimed in claim 3 or claim 4 including the step of achieving the respective diffusion brazing and brazing alloy melting in a vacuum furnace.

6. A method of filling a fissure as claimed in claim 5 including the steps of partially cooling the article in said vacuum furnace, further cooling the article by blowing with an inert gas and finishing the cooling of the article in aatmosphere.

* * * * *